United States Patent [19]

Sheppard et al.

[11] Patent Number: 4,842,174
[45] Date of Patent: Jun. 27, 1989

[54] FLEXIBLE MOUNT FOR MOBILE APPARATUS

[76] Inventors: Mark E. Sheppard, 8891 Henton Dr., Huntington Beach, Calif. 92646; David L. Yacobucci, 25331 Via Viejo, El Toro, Calif. 92630

[21] Appl. No.: 35,396

[22] Filed: Apr. 7, 1987

[51] Int. Cl.$^4$ ............................ F16L 3/08; B60R 11/02
[52] U.S. Cl. ............................ 224/273; 224/42.45 R; 248/535; 248/160; 108/45; 379/454; 138/DIG. 8; 138/129
[58] Field of Search ............... 248/534, 535, 503, 56, 248/57, 65, 71, 309.1, 309.2, 518, 274, 519, 160; 285/390; 108/44, 45; 74/501 R; 362/419; 379/454, 455, 457; 224/273, 42.41, 42.45 R, 42.46 R, 277, 282; 138/DIG. 8, 131, 139, 134, 129

[56] References Cited

U.S. PATENT DOCUMENTS

| D. 264,633 | 5/1982 | Pearlman | D26/62 |
|---|---|---|---|
| 567,531 | 9/1896 | Arnold | 138/131 X |
| 803,646 | 11/1905 | Walton | 748/535 |
| 1,011,405 | 12/1911 | Burns | 379/454 |
| 1,790,500 | 1/1931 | Fischer | 248/160 |
| 2,111,368 | 3/1938 | Kron | 248/160 |
| 2,295,676 | 9/1942 | Meyer | 248/534 X |
| 2,392,447 | 1/1946 | Archer | 248/160 |
| 2,481,271 | 9/1949 | Willey | 248/160 X |
| 2,499,803 | 3/1950 | Benkendorff | 224/273 |
| 2,558,763 | 7/1951 | Lee | 138/131 X |
| 2,597,670 | 5/1952 | Pinto | 248/160 |
| 2,723,426 | 11/1955 | Pelley | 138/DIG. 8 |
| 3,110,429 | 11/1963 | Philips | 224/42.42 |
| 3,145,050 | 8/1964 | Edwards | 74/501 R |
| 3,184,548 | 5/1965 | Krulwich | 248/160 X |
| 3,391,960 | 7/1968 | Megargle et al. | 296/24 R |
| 3,589,577 | 6/1971 | Basinger | 224/42.42 |
| 3,727,813 | 4/1973 | Eby | 224/42.42 R |
| 4,023,757 | 5/1977 | Allard et al. | 248/160 X |
| 4,061,258 | 12/1977 | Dysart | 224/42.42 R |
| 4,097,012 | 6/1978 | McIntyre | 248/674 |
| 4,238,816 | 12/1980 | Merlo | 362/279 |
| 4,524,701 | 6/1985 | Chappell | 108/44 |
| 4,593,877 | 6/1986 | van der Wyk | 248/535 X |

FOREIGN PATENT DOCUMENTS 2051104  12/1978  Fed. Rep. of Germany ...... 379/454

Primary Examiner—Henry J. Recla
Assistant Examiner—Ernest G. Cusick
Attorney, Agent, or Firm—Knobbe, Martens, Olson & Bear

[57] ABSTRACT

A mounting apparatus including a flexible, generally tubular support arm having threadably attached to one end thereof an equipment mounting member, and having threadably attached, at the other end thereof a vehicle support attachment member. A first attachment member is configured for mounting to a somewhat horizontal portion of the vehicle such as the floor, while a second attachment member is configured for side mounting. The flexible support arm is configured to provide a measure of resistance to flex sufficient to support the equipment without movement during operation of the vehicle, while sufficient to flex away from the occupants in the event of impact. The mounting member and the attachment member are relatively small in dimension and secured at extreme ends of the flexible portion of the support arm.

19 Claims, 1 Drawing Sheet

4,842,174

FLEXIBLE MOUNT FOR MOBILE APPARATUS

BACKGROUND OF THE INVENTION

The background of the invention will be discussed in two parts.

1. Field of the Invention

This invention relates to a mounting apparatus, and more particularly to a flexible mount for support of electrical or electronic apparatus in a vehicle.

2. Description of the Prior Art

Emergency vehicles are generally provided with radiotelephones and other electrical or electronic apparatus, normally in a position for convenient use and operation by the driver of the vehicle. Vehicular radiotelephones have also become generally available to the public. In addition, particularly in emergency vehicles, recent equipment includes data terminals with video viewing screens or printers, along with an associated keyboard entry devices which may be separate or integrally housed. With such equipment, the user portion, be it a radio or telephone handset, or a keyboard entry device, must be accessible to the operator or user without hazard. In vehicles with two occupants, such as some police cars, and the like, some provision must be made to provide both driver and front seat passenger with access to the electrical or electronic device.

Such mobile apparatus has typically been fixedly attached to some structural portion of the vehicle, such as the centrally positioned longitudinally extending tunnel on the interior of the vehicle, or on some structural member beneath the dashboard, or to the floor or the like. The attachment means have normally been in the form of structurally rigid frames or mounting members. In some cases, where two occupants of the vehicle are required to have access to the same devices, such devices have been mounted on swivel plates attached to rigid post members.

With such electrical and electronic apparatus within the front passenger portion of the vehicle, there is an encroachment into the passenger compartment of bulky electrical devices, on rigid mounting systems. In addition, the physical encroachment may be acute for that apparatus which may require constant or intermittent attention by the driver. If the user portion is remote from the view and/or hand of the user, a distraction may occur during driving which, in and of itself, represents a safety problem. Such a prospect with trained police or emergency vehicle personnel is serious enough, without the additional safety problems arising as a consequence of car radiotelephones being generally available to the public at large. For such usage, the equipment, or at least the user operated portion of the equipment, if separate, is mounted at a position within view or within reach, where it can be accessible without major distraction. In such circumstances, regardless of the size of the mounted device, a rigid member or frame, affixed to a structural portion of the vehicle, is in proximate relation to a human occupant.

With such structurally rigid electrical or electronic equipment mounts in proximity to the occupant, a greater measure of risk of harm exists to an occupant in the event of a collision.

Illustrative of prior art vehicular equipment mounting frames or supports are the devices shown in U.S. Pat. Nos. 3,727,813, issued to Eby on Apr. 17, 1973; 4,061,258, issued to Dysart on Dec. 6, 1977; and 4,097,012, issued to McIntyre on June 27, 1978. In U.S. Pat. No. 3,589,577, issued to Basinger on June 29, 1971, an entire stand is fabricated for positioning adjacent an operator of a taxicab, for the purpose of providing shelf space for sundries, as well as communication equipment and a fare meter.

Vehicular mounting and support structures for auxiliary devices, such as snack tables, are shown and described in U.S. Pat. Nos. 3,391,960, issued on July 9, 1968 to Megargle et al; and 4,524,701, issued to Chappell on June 25, 1985. U.S. Pat. No. 3,110,429, issued on Nov. 12, 1963 to Philips for a removable shelf structure for a station wagon.

Other patents uncovered in a search include U.S. Pat. No. 4,238,816, issued Dec. 9, 1980 to Merlo for a lamp having a suction base portion and a flexible arm; and Des. 264,633, which issued May 25, 1982, t Pearlman for a lamp.

In accordance with an aspect of the invention, it is accordingly an object of the invention to provide a flexible mounting system for electrical and electronic vehicular equipment, and portions thereof.

SUMMARY OF THE INVENTION

The foregoing and other objects of the invention are accomplished by providing a mounting apparatus including a flexible, generally tubular support arm having threadably attached to one end thereof an equipment mounting member, and having threadably attached, at the other end thereof a vehicle support attachment member. A first attachment member is configured for mounting to a somewhat horizontal portion of the vehicle such as the floor, while a second attachment member is configured for side mounting. The flexible support arm is configured to provide a measure of resistance to flex sufficient to support the equipment without movement during operation of the vehicle, while sufficient to flex away from the occupants in the event of impact. The mounting member and the attachment member are relatively small in dimension and secured at extreme ends of the flexible portion of the support arm.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
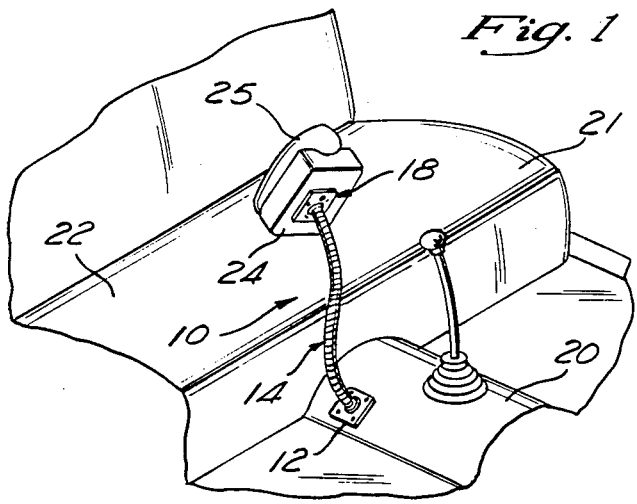
FIG. 1 is a perspective view of a first embodiment of the flexible mounting apparatus in accodance with the invention supporting a vehicular radiotelephone.

Referring now to the drawings, and particularly to FIG. 1, there is shown a preferred embodiment of an electrical or electronic equipment vehicular mounting apparatus, generally designated 10, the apparatus 10 including a vehicular attachment member 12, a flexible generally elongate support arm member 14 and an equipment mounting member 18. As illustrated, the attachment member 12 is secured to the vehicle such as by attachment to the vehicle floor 20 at the tunnel or hump intermediate the driver and passenger seats 21 and 22, respectively, with the equipment mounting member 18 secured to the underside of the cradle portion 24 of a radiotelephone, with the handset 25 resting thereon in proximity to a driver of the vehicle.

Figure 2:
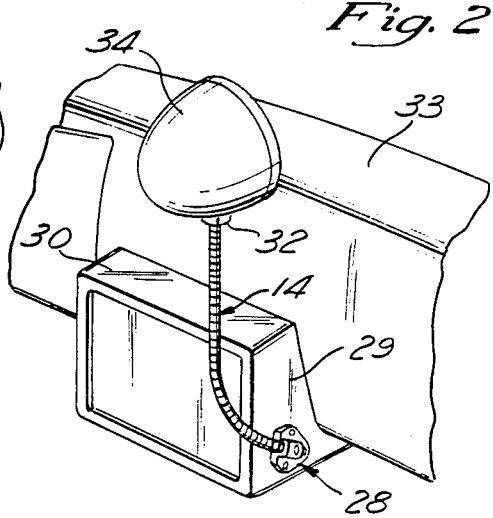
FIG. 2 is a perspective view of a second embodiment of the flexible mounting apparatus in accordance with the invention supporting an emergency vehicular light with a side mount vehicle attachment member.

FIG. 2 depicts another arrangement, in which the attachment member 28 is configured for mounting to a side surface 29 of a projecting portion or console 30 formed as part of the vehicle dashboard 33, the attachment being at a point which provides structural rigidity relative to the vehicle. As in the embodiment of FIG. 1, the support arm 14 is threadably attached to the attachment member 28 with another type of mounting member 32 threadably attached at the other end. In this embodiment, electrical equipment, such as an emergency vehicle lamp 34, is coupled to the mounting member 32. Emergency lights, such as lamp 34, on a vehicle, are energized only when needed, and, when located on the interior of a vehicle, must be positioned in proximity to the windshield of the vehicle, thereby providing a measure of visual obstruction to the driver of the vehicle. In this particular arrangement, shown in FIG. 2, the emergency lamp 34 may be readily pivoted downwardly, below the dashboard 33 and thereby concealed from view, until needed.

Figure 4:
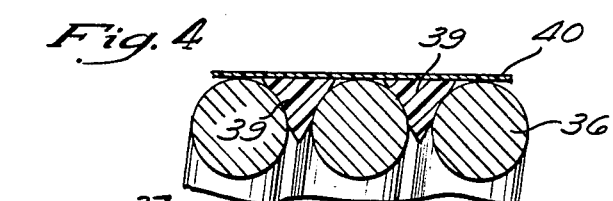
FIG. 4 is an enlarged cross-sectional view of the flexible support member of FIG. 3, as viewed generally along line 4—4 thereof.
Figure 3:
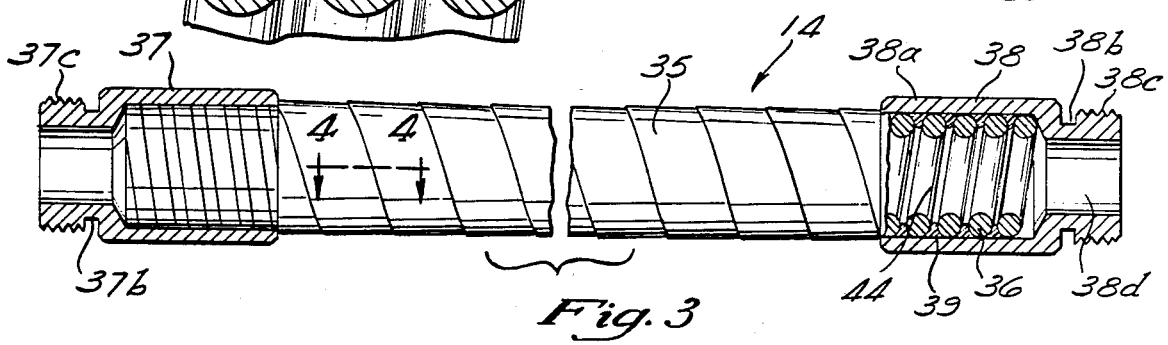
FIG. 3 is a plan view, partially broken away, of the flexible support member used in the apparatus of FIGS. 1 and 2.

Referring now to FIGS. 3 and 4, the details pertaining to the support arm 14 will be described. The support arm 14 includes a flexible stalk portion 35 with first and second generally identical fittings 37 and 38 at opposite ends thereof. The stalk portion 35 is formed from a helical coil 36 of suitable material, such as heavy gauge spring wire, with space between turns. A filler strip 39 of suitable elastomeric material is helically wound about the exterior in the space between turns, as shown in FIG. 4, the strip 39 having a triangular cross-sectional configuration for providing a closely abutting generally tangential relation with the proximate surfaces of adjacent coils, while providing a generally planar exterior surface, which is covered by a continuous strip 40 of vinyl tape or the like. The degree of flex and the resistance to flex of the stalk portion 35 of the support 14 is determined by a combination of the gauge of the wire 36, the spacing between adjacent turns thereof, the composition and density of the elastomeric material used for strip 39 and, in part, by the thickness of the vinyl tape 40 and the pressure with which it is applied. Desirably, the stalk 35 has a degree of resistance to flexure sufficient to enable the support arm 14 to support the weight of the equipment thereon, such as the emergency lamp 34, or the radiotelephone cradle 24 and handset 25, at a position set by the operator of the vehicle, without displacement due to operation of the vehicle. On the other hand, the resistance to flexure must be sufficiently low to enable an operator to manually set the equipment thereon at a desired position, and correspondingly, sufficiently low to permit movement or displacement of the equipment in the event of accidental impact therewith.

As shown in FIG. 3, the fittings 37 and 38 have hollow interiors in alignment with the axial opening 44 of the stalk 35 to thereby provide a conduit for passage therethrough of electrical lead wire (not shown) associated with the electrical or electronic equipment of devices. The fitting 38 is shown in cross-section and includes a tubular portion 38a with the interior thereof dimensioned to form a recess for receiving therein one end of the stalk 35. At the bottom of the recess, the fitting 38 is provided with a necked portion 38b, followed by an enlarged externally threaded end 38c, with an axial opening 38d therethrough in alignment with the stalk opening 44. For ease of manufacture, the fittings 37 and 38 are identically configured and provided with like dimensioned threads for attachment to the equipment support members 24 or 32 at one end, and the attachment members 12 or 28 at the other end. It is to emphasized that, in accordance with the present invention, the flexible stalk 35 is substantially longer than the combined length in the axial direction of the fittings 37 and 38 to provide a minimum length of inflexible or rigid mounting structure for the apparatus 10 within the vehicle compartment, to thereby minimize the risk of harm to an occupant of the vehicle as a result of the equipment mounting arrangement.

Figure 5:
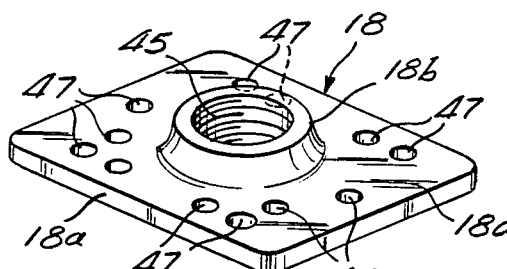
FIG. 5 is a perspective view of the equipment mounting plate used in the apparatus of FIG. 1.

FIG. 5 depicts the equipment mounting member 18 shown in FIG. 1, the member 18 having a generally rectangular or square plate portion 18a and a central boss portion 18b protruding form a lower surface thereof, the boss portion 18b having a threaded aperture 45 extending therethrough in a direction generally perpendicular to the plane of the plate portion 18a. In depth or thickness, the theaded opening 45 of boss portion 18b is equal to, or slightly less than the combined length of the threaded end 38c and necked portion 38b, with the shoulder of the boss portion 18b, upon tightening, abuttingly engaging the shoulder provided at the junction of the necked portion 38b and tubular portion 38a of fitting 38.

The length and width of the plate portion 18a is selected to be less than the adjacent dimensions of the surface of the equipment to which it attaches, i.e., the underside of the cradle 24 of the radiotelephone, with the thickness of plate portion 18a being thick enough to support the equipment and thin enough to be unobtrusive.

For attachment of the plate portion 18a of mounting member 18 to the cradle 24, a plurality of openings 47 are provided. As shown, there are twelve openings 47, some of the openings being symmetrically arranged, while other are not. The selection of the positions for the twelve openings 47 enables the use of three or four of the openings 47 for attachment of a particular device or piece of equipment, by use of screws passed therethrough into engagement with threaded mounting openings on the device, which latter openings are provided by the manufacturer of the device. Since mounting hole patterns on the device itself vary from one manufacturer to another of the same type of equipment, the provision of twelve mounting holes in the plate portion 18a enable use of a single mounting member 1, with a somewhat universal hole pattern for a variety of electrical or electronic devices.

Figure 6:
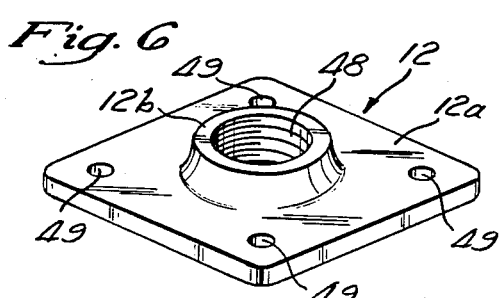
FIG. 6 is a perspective view of the vehicle attachment member used in the apparatus of FIG. 1.

The attachment member 12, as shown in FIG. 6, is similarly constructed, that is, with a square or rectangular plate portion 12a and a central boss portion 12b with a threaded aperture 48 for receiving therein the threaded end of a fitting 37 or 38. The threaded aperture 48 extends through the boss portion 12b, and is of a length equal to or less than the combined length of the engaging thread 37c and adjacent neck portion 37b of fitting 37. The plate portion 12a is provided with four mounting apertures 49 at the corners thereof for passage therethrough of suitable fastening members, such as screws or the like. It is to be understood that either member 12 or 18 may be attached to either fitting 37 or 38.

Figure 7:
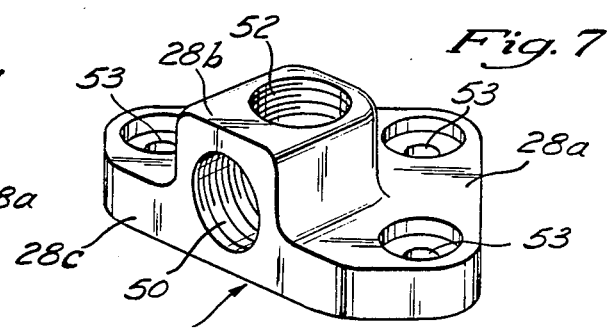
FIG. 7 is a top perspective view of the side mount vehicle attachment member used in the apparatus of FIG. 2.
Figure 8:
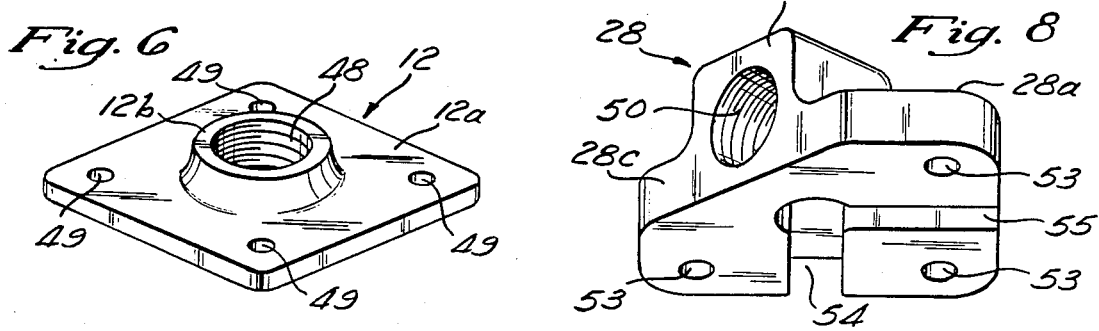
FIG. 8 is a bottom perspective view of the side mount vehicle attachment member of FIG. 7.

FIGS. 7 and 8 depict an alternate attachment member 28 which is shown in the apparatus of FIG. 2 for mounting to the side of a portion of the vehicle structure, although the same member 28 may be used for mounting to a horizontal surface with the support arm 14 extending at right angles thereto. For this purpose, the member 28 is formed, for example, from a casting, with a plate portion 28a and an enlarged boss portion 28b adjacent an edge thereof. The plate portion 28a is formed as a five-sided figure which is basically a square with a diagonal cut extending from the midpoint of one side to the midpoint of an adjacent side. A face of the enlarged boss portion 28b is generally planar and coextensive with this diagonal edge 28c. A first threaded aperture 50 is formed in the boss portion 28b with the axis thereof perpendicular to the plane of the face thereof, with a second orthogonal intersecting threaded aperture 52 extending through the boss and through the plate portion 28a in a direction generally perpendicular to the plane of the plate portion 28a. Both apertures 50 and 52 are formed as through holes. Three mounting holes 53 are formed in the plate portion 28a adjacent the three right anular corners thereof. On the undersurface of the plate portion 28a, as shown in FIG. 8, first and second channels 54, 55 are formed, the channels 54 and 55 being perpendicular to one another and intersecting at the center of the threaded aperture 52. With the plate portion 28a of member 28 affixed to a surface, these channels 54 and 55, in conjunction with the attaching surface provide conduits and, as can be seen, electrical lead wires for the equipment or device may be run through the conduit of the support arm 14, through the fitting 37 or 38 in either aperture 50 or 52, and then through one of the channels 54 or 55, if need be, for connection to a power terminal or other electrical or electronic apparatus.

With the small dimensions of the alternate mounting member 28, upon securing to the vehicle, such as at the side 29 of the console 30, the rigid portion of the mounting apparatus at the attachment end is within the dimensional limits of the console 30, with the majority of the apparatus 10 encroaching into the driver's compartment being the flexible, yieldable support arm 14. The mounting member 18 or 32 adds very little in size to the equipment 24 or 34 attached thereto.

Alternate equipment may be readily accommodated by the mounting apparatus 10, such as vehicular teletype keyboards, vehicular terminal display devices, or the like, with the existing mounting member 18, or with slight modification thereof by an increase in dimension to support a broader adjacent surface area of the attached device. Correspondingly, although not shown, other vehicular support attachment arrangements may be employed. For example, one fitting 37 or 38 may be removed from the support arm 14, and this end may be readily attached to a structural cross-member beneath the dashboard 33, andout of view by a suitable pipe clamp, C-clamp or the like.

With the threadable connections of the mounting apparatus 10, as shown and described, the equipment thereon may be readily removed for repair, replacement, or even for security during extended absence from the vehicle. In any event, there has been shown and described a preferred embodiment. It is to be understood, however, that various other adaptations and modifications may be made within the spirit and scope of the invention.

What is claimed is:

1. A mounting apparatus for use in a vehicle for supporting an electrical or electronic device in proximity to the driver of the vehicle, said apparatus comprising:
   a mounting member for attachment to a supporting portion of the vehicle;
   a plate memer for attachment to a surface of the device;
   a flexible support arm having an axial opening therethrough and first and second ends, said first end having means for securing said first end to said mounting member, said mounting member being configured for enabling passage of electrical lead wires from the device through said axial opening; and
   a fitting secured to said second end, said plate member and said fitting having matingly threaded portions for threadably attaching said plate member to said fitting with said fitting configured for enabling access to the electrical lead wire within said axial opening, said plate member having a dimensional surface smaller than the surface of the device to which it is attached, said support arm having flex sufficient to enable a user to place the device thereon at a set position within the vehicle and having a resistance to flex sufficient to preclude displacement of the device on the apparatus from the set position during motion of the vehicle.

2. The apparatus according to claim 1 wherein said support arm is a flexible support arm formed of a helical coil of wire of multiple turns with space therebetween.

3. The apparatus according to claim 2 wherein said support arm further includes a helically wound friction strip member in the space between adjacent turns of the coil of wire and a cover material encircling said strip member and said coil.

4. The apparatus according to claim 1 wherein said mounting member includes a threaded opening and said fitting includes a threaded portion having an axial opening therethrough for enabling passage of electrical lead wire from said device through said fitting and said arm.

5. A mounting apparatus for use in a vehicle for supporting an electrical or electronic device at a point of attachment on a surface of the device in proximity to the driver of the vehicle, said apparatus comprising:
   a plate member for attachment to a surface of the device, said plate member having a a dimensional area smaller than the device surface;
   a flexible support arm member having opposite ends;
   means on one end of said support arm member for attaching said one end of said support arm member to a supporting portion of the vehicle;
   a generally rigid fitting attached to the other end of said support arm member and having means for releasable securing to said plate member, said support arm member being sufficiently flexible to enable a user to place the device thereon at a set position within the vehicle and having a resistance to flex sufficient to preclude displacement of the device on the apparatus from the set position during motion of the vehicle; and conduit means formed in said support arm, said conduit means, said fitting and said plate member being configured for enabling passage of electrical lead wires through said conduit means from the device.

6. The apparatus according to claim 5 wherein said means on one end of said support arm member includes a fitting generally identical to the fitting on said other end of said support arm member.

7. The apparatus according to claim 6 wherein said means on said one end of said support arm member includes an attachment member having at least one threaded aperture fo engagement with the threaded portion of said fitting on said one end.

8. The apparatus according to claim 7 wherein said attachment member includes first and second threaded apertures having the axes thereof in generally perpendicular relation.

9. The apparatus according to claim 8 wherein the axes of said first and second apertures intersect.

10. The apparatus according to claim 9 wherein said attachment member includes a plate portion.

11. The apparatus according to claim 10 wherein said plate portion of said attachment member is provided with channel means in the surface thereof in intersecting relation with said apertures for enabling passage of electrical led wire through said channel means.

12. The apparatus according to claim 6 wherein each of said fittings includes a threaded portion.

13. The apparatus according to claim 5 wherein said support arm member has an axial opening therethrough to form said conduit means and each of said fittings has an opening in alignment with said axial opening for enabling passage of electrical lead wire therethrough from the device.

14. A mounting apparatus for use in a vehicle for supporting an electrical or electronic device at a point of attachment on a surface of the device in proximity to the driver of the vehicle, said apparatus comprising:

a first attachment member configured for attachment to a surface of the device;

a second attachment member configured for attachment to a supporting portion of the vehicle;

a flexible support arm having opposite ends, said support arm being helically formed of multiple turns of spaced wire material with an axial opening therethrough;

first and second generally identical fittings attached to the opposite ends of said support arm member, each of said fittings having an opening therethrough in communication with said axial opening for enabling passage of electrical lead wire therethrough from the device;

means on said first fitting for coupling to said first attachment member; and means on said second fitting for coupling with said second attachment device, said support arm member being sufficiently flexible to enable a user to manipulate the device thereon to be set position within the vehicle and having a resistance to flex sufficient to preclude displacement of the device on the apparatus from the set position during motion of the vehicle.

15. The apparatus according to claim 14 wherein said means on said first and second fittings for coupling include threaded portions.

16. The apparatus according to claim 15 wherein said second attachment member includesmeans for threaded coaction with the threaded portion of said second fitting.

17. The apparatus according to claim 15 wherein said second attachment member includes first and second threaded apertures configured for receiving the threaded portion of said second fitting.

18. The apparatus according to claim 17 wherein said first and second threaded apertures have the axes thereof generally perpendicular to one another.

19. The apparatus according to claim 18 wherein said second attachment member includes a generally planar surface configured for abutting relation with the supporting portion of the vehicle and said planar surface includes channel portions communicating with said first and second apertures for enabling passage of electrical lead wires through one of said first and second apertures via the related one of said channel portions.

* * * * *